United States Patent
Forgatsch et al.

(10) Patent No.: US 7,806,476 B2
(45) Date of Patent: Oct. 5, 2010

(54) SEAT, ESPECIALLY AN AIRPLANE OR VEHICLE SEAT

(75) Inventors: Oliver Forgatsch, Winnenden (DE); Hartmut Schürg, Schwäbisch Hall (DE); Sven Achilles, Trophy Club, TX (US)

(73) Assignee: Recaro Aircraft Seating GmbH & Co. KG, Schwäbisch Hall (DE)

( * ) Notice: Subject to any disclaimer, the term of this patent is extended or adjusted under 35 U.S.C. 154(b) by 336 days.

(21) Appl. No.: 10/546,731

(22) PCT Filed: Jan. 30, 2004

(86) PCT No.: PCT/EP2004/000821

§ 371 (c)(1),
(2), (4) Date: Sep. 27, 2006

(87) PCT Pub. No.: WO2004/074039

PCT Pub. Date: Sep. 2, 2004

(65) Prior Publication Data

US 2007/0029853 A1 Feb. 8, 2007

(30) Foreign Application Priority Data

Feb. 24, 2003 (DE) .............................. 103 08 454

(51) Int. Cl.
- *A47C 7/14* (2006.01)
- *A47C 7/02* (2006.01)
- *B60N 2/02* (2006.01)
- *B60N 2/62* (2006.01)

(52) U.S. Cl. ............................ 297/284.11; 297/452.21; 297/452.54; 297/452.55

(58) Field of Classification Search ............ 297/284.11, 297/452.21, 452.49, 452.51, 452.54, 452.55, 297/232

See application file for complete search history.

(56) References Cited

U.S. PATENT DOCUMENTS 3,883,173 A 5/1975 Shephard et al.

(Continued)

FOREIGN PATENT DOCUMENTS

DE 28 43 223 4/1980

(Continued)

*Primary Examiner*—David Dunn
*Assistant Examiner*—Tania Abraham
(74) *Attorney, Agent, or Firm*—Roylance, Abrams, Berdo & Goodman, L.L.P.

(57) ABSTRACT

A seat, especially an airplane or vehicle seat, has a seat part placed on the stand-type seat structure (12) in relation to a base and provided with a bearing part (18) on its front side. The bearing part (18) is embodied in a flexible manner and can move in the direction of the seat structure (12) when a predefined seating load is exerted on it. When the load is discharged, it can move back into its initial position in the opposite direction from the seat structure (12). This arrangement creates a seat whose front part is maintained in a flexible manner such that the front area of the seat part yields according to the seating load exerted by the seat user. The pressure forces are limited to the lower side of the upper thighs of the seat user. As a result, the cross-sections of the veins in that region are not reduced, but are maintained such that the circulation of the blood is not impeded, significantly reducing the risk of thrombosis.

21 Claims, 1 Drawing Sheet

U.S. PATENT DOCUMENTS

| | | |
|---|---|---|
| 4,498,702 A | 2/1985 | Raftery |
| 4,660,887 A | 4/1987 | Fleming et al. |
| 5,100,201 A * | 3/1992 | Becker et al. ............ 297/301.3 |
| 5,133,587 A * | 7/1992 | Hadden, Jr. ................. 297/146 |
| 5,716,099 A * | 2/1998 | McDiarmid .............. 297/302.1 |
| 6,086,153 A * | 7/2000 | Heidmann et al. ....... 297/300.1 |
| 6,422,650 B1 * | 7/2002 | Chien-Shen ................ 297/312 |
| 2003/0080595 A1 * | 5/2003 | Wilkerson et al. ........ 297/300.2 |

FOREIGN PATENT DOCUMENTS

| | | |
|---|---|---|
| DE | 44 23 957 | 1/1996 |
| DE | 196 81 383 | 4/1998 |
| EP | 0 216 578 | 4/1985 |
| EP | 1 044 877 | 10/2000 |

* cited by examiner

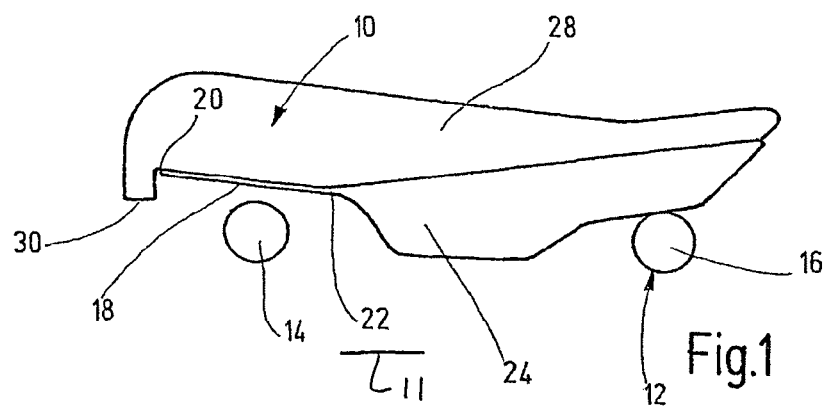
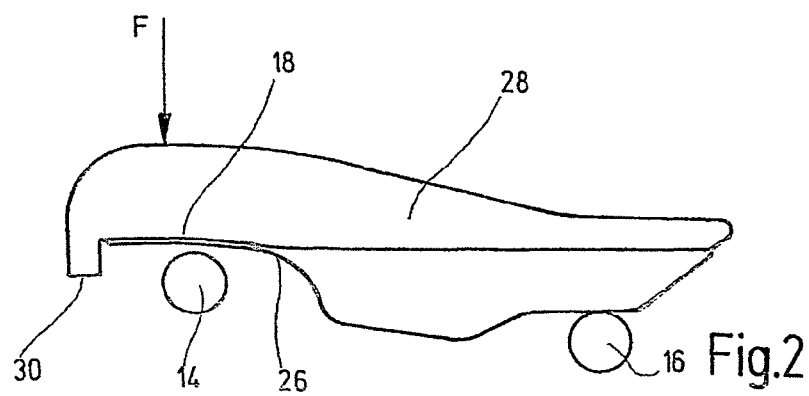
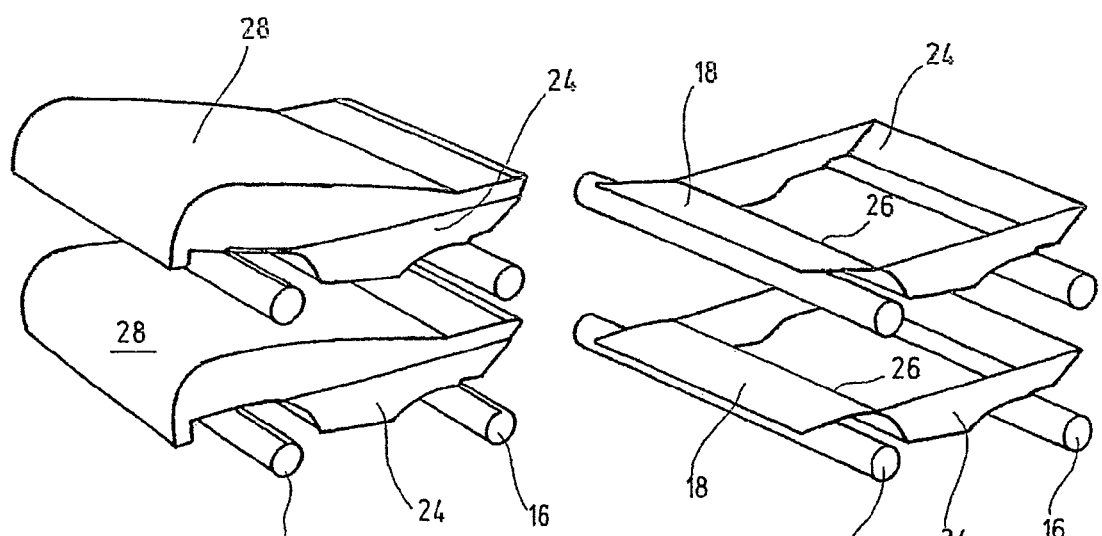

SEAT, ESPECIALLY AN AIRPLANE OR VEHICLE SEAT

FIELD OF THE INVENTION

The present invention relates to a seat, especially an airplane or vehicle seat, with a seat part mounted upright on a seat structure relative to the floor and provided with a supporting part on its front.

BACKGROUND OF THE INVENTION

Especially on very long passages or trips, such as long-distance flights, but also on cruises, for example, by ferries, a general object of the aircraft and ferry outfitters is to increase the comfort of seat occupants and, accordingly, of the passengers who are to be transported. Especially in first class and business class, the customers have corresponding ideas about what they want, which wishes are to be satisfied. A trend among passengers is to be able to use the travel time for meaningful rest or sleeping, in order, for example, to effectively counteract jet lag at the destination for long-distance flights or the like.

DE 100 91 484 A1 discloses a vehicle seat, especially an aircraft passenger seat, with a seat part and backrest held to be able to move relative to one another by at least one adjustment device. In the known solution, the respective adjustment device has several articulations which are connected to one another at least partially by a rod supporting framework as the seat structure, which bears the seat part and which executes traversing motion by an actuating means. The seat part can then be moved out of an initial position into other positions used for resting and sleeping and vice versa, depending on the number of attached articulations and rod parts of the rod supporting framework. The number of possibilities for movement and therefore the degrees of freedom of movement for the seat part are greatly increased compared to known solutions, so that positioning of the seat part and backrest is possible within very wide adjustment ranges. The known seat has pivoting leg and foot rests. The bottom of the leg area, especially the bottom of the thigh of the seat occupant, can be relieved, so that harmful pressure which reduces the cross section of the veins and thus the danger of thromboses are reduced. Based on the price structure of the pertinent seats and with respect to their space and weight requirement, they are used essentially only in first class and business class, and cannot be easily used for economy class. Furthermore, with the known seat design, likewise the veins are exposed to strain, especially for the case in which the seat is in the upright (take-off position) and the leg and foot rests, which relieve the cross sections of the veins are folded down such that the corresponding support and relief are then not available.

SUMMARY OF THE INVENTION

An object of the present invention is to provide a seat, especially an aircraft or other vehicle seat, which can be universally used and which does not have the described disadvantages in the prior art, especially by helping to avoid the danger of thromboses for long passages or trips.

This object is basically achieved by a seat where its supporting part is made flexible, and at a definable seat load, can be moved in the direction of the seat structure. When unloaded, the supporting part moves back in the reverse direction away from the seat structure into its initial position. The seat front area is flexibly held, so that, depending on the respective seat load applied by the seat occupant, the front area of the seat part yields. In this way, the seat reduces the compressive forces on the bottom of the thigh of the seat occupant, with the result that the cross sections of the veins in this area are not reduced, and are maintained with the result that blood circulation is not disrupted. Thus, the risk of thrombosis is clearly reduced. With the present invention, a maximum support area of the thigh in any seat position is consequently achieved, while avoiding compressive forces mainly in the forward area of the bottom of the thigh. Furthermore, harmful shearing forces on the bottom of the thigh are also avoided. The pertinent shearing forces which are to be reduced arise especially in the area of the thigh in the reclining position compared to the upright seat position (take-off position) in which a more radically set seat angle is necessary. It is this greater seat angle which causes an increase in the pressure on the bottom of the thigh when the legs are extended (slough position), with the danger of increasing the risk of thrombosis for the seat occupant. The occurrence of these shear forces is reliably avoided by the yielding capacity of the front area of the seat part.

The pertinent "healthy seat" can also be used in the area of motor vehicles, for example, for busses. Other applications are conceivable in the area of medical treatment chairs, and in dentistry. Furthermore, the comfort of the seat also increases for those seats equipped with pivoting leg and foot rests for relieving the bottom of the thigh. Comfort for these seats, certainly in the upright position, can also be further enhanced in this way.

In one preferred embodiment of the seat of the present invention, the flexible supporting part is designed as a spring which can be freely moved with one end and with its other end fixed on elements of the seat part and/or of the support structure. If this spring is designed as a rectangular leaf spring, this design can be regarded as a loaded, free rest, the bending stress assuming its highest values at the bearing point and decreasing uniformly with increasing distance from the latter. Preferably, the supporting part in its flexible configuration is made of a thermoplastic, but preferably of a fiber composite, especially a fiber composite fabric which is furthermore preferably an integral component of a seat shell which bears the foam cushion of the seat part. In this way, it also contributes to the comfort of sitting for the seat occupant.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIGS. 1 and 2 each is a side elevational view (not to scale) of the seat part of a seat according to an embodiment of the present invention, without load application and with load application shown by the force arrow F, respectively;

FIG. 3 are perspective views corresponding to FIGS. 1 and 2 arranged one on top of one another; and FIG. 4 are perspective views corresponding to FIG. 3, without the foam cushion and likewise arranged one on top of one another.

DETAILED DESCRIPTION OF THE INVENTION

The seat of the present invention is configured especially as an aircraft seat, preferably a passenger seat. In FIG. 1, in a side view, essentially only the seat part 10 of the overall seat is illustrated. In particular, for the sake of simplification, the backrest and/or any foot and leg rests are not shown. The pertinent seat part 10 is accordingly mounted upright or above, relative to a vehicle floor or aircraft cabin deck (not shown) vertically by the seat structure 12. Of the actual seat structure 12 shown in FIG. 1, only the two upper cross members are shown as support members 14, 16. On its front area adjacent the front support member 14 the seat part 10 has a flexibly made supporting part 18. At a definable seat load F (cf. arrow in FIG. 2), supporting part 18 moves in the direction of the seat structure 12, especially in the form of the front support member 14. When relieved accordingly, the flexible supporting part 18 consequently returns from its position shown in FIG. 2 in the reverse direction to its initial position as shown in FIG. 1. In the initial position, the bottom of the supporting part 18 assumes or is at a definable distance from the top of the front support member 14. The pertinent distance does not have to be guaranteed over the entire width of the supporting part 18, but can preferably suffice to ensure this distance in the area of the support of the bottom of each thigh of a seat occupant. This arrangement will be detailed below.

The flexible supporting part 18 is designed as a resilient spring which can be freely moved at one end or free front end 20. Its other end or connecting end 22 can be fixed on elements of the remaining seat part 10, as is shown in the figures, and/or alternatively on parts of the seat structure 12. To obtain the indicated bending or leaf spring characteristic, the supporting part 18 is designed as a flexible support plate of, for example, sheet metal material, and mounted in a cantilever manner. For reasons of safety engineering and for reasons of saving weight, however the indicated support plate is preferably of a thermoplastic material. It has been found to be especially advantageous to form the supporting part 18 from a fiber composite material, for example, in the form of a fiber composite fabric of carbon fiber, kevlar, or the like. Metallic leaf spring parts can also be laminated into the fiber composite for support at the same time.

From the standpoint of production engineering, it has proven especially advantageous to form the supporting part 18 as an integral component of the actual seat shell 24. This seat shell 24 is shown particularly in FIG. 4 in an overhead perspective. With an integral configuration, the plate-like supporting part 18 extends along the front transverse side 26 of the seat shell 24. This seat shell 24 is used in particular to hold the foam cushion 28 which enhances comfort and which is preferably of a noncombustible polyurethane foam. As FIGS. 1 to 3 show, the foam cushion 28 with a catch-like projection 30 overlaps the flexible supporting part 18 along its front end 20. The supporting part 18 is then essentially an integral component of a recess, extending on the bottom of the polyurethane foam cushion 28.

To compensate in relative terms for the length between the foam cushion 28 and the seating part 18 in the area of the supporting part 18, the foam cushion 28 merely rests on the supporting part 18, and is otherwise held in the seat shell 24. On the opposite side of the overlap of the foam cushion 28 on the supporting part 18, with the corresponding force loading (force arrow F), the supporting part 18 can be supported on its bottom on the top of a support site formed by the transversely extending front support member 14. The indicated support site can be formed, in contrast to the drawing in FIG. 2, by the entire support surface of the top of the front support member 14. The possibility exists of providing, extending transversely to the front support member 14, the plate-like supporting part 18 in the direction of its center with an increasing bulge. In this bulge area, the spring stiffness of the supporting part 18 is greatest and decreases to the outside toward the support sites on the front support member 14. Thus, there is especially gentle application of force, since, depending on the seat load, due to the thigh support towards either end of the front support member 14 a sliding motion takes place. It is also possible alternatively or in addition to achieve the desired center bulge by the configuration of the front support member 14.

In the direction of FIG. 2, in the loaded state, the supporting part 18 is configured to extend slightly curved so that in the area of the support or rest a relative sliding motion between the supporting part 18 and the front support member 14 is achieved in the longitudinal direction of the seat part 10. This curvature in the loaded state, as is furthermore shown in FIG. 2, is simultaneously received into the front wall area of the seat shell 24. In this way, harmonic force application occurs in the area of the transition 26 from the supporting part 18 to the seat shell 24.

The seat structure 12 has a rear support member 16 which likewise extends transversely to the seat part 10 along its back end. By way of this additional support member 16, the seat part 10 is securely connected to the seat structure 12. For the seat adjustment motion, the seat part 10 can move relative to the stationary seat structure 12 with its two support members 14, 16 by a corresponding lateral guide (not shown). This guide can be achieved without adversely affecting the function of the resilient supporting part 18. As FIG. 1 shows in the unloaded state, the supporting part 18 forms a surface which rises in the direction of the front edge of the seat. For the seat occupant especially in the take-off phase with the backrest raised, this arrangement offers good support. This rising surface of the seat part is maintained at least over the top of the polyurethane foam cushion 28 even if, as shown in FIG. 2, due to the load by the thigh, the supporting part 18 is lowered for purposes of support on the top of the front support member 14.

The flexible front edge of the seat of the present invention has the advantage that accordingly with a relatively small foam thickness of the foam body 28 which promotes a reduction of weight, a high degree of adaptation to the seat occupant is ensured. Due to the flexible yielding capacity of the supporting part 18, shearing forces in the area of the thigh are also greatly reduced in the reclining seat position, and the cross sections of the veins are relieved accordingly so that the risk of thrombosis drops distinctly.

While one embodiment has been chosen to illustrate the invention, it will be understood by those skilled in the art that various changes and modifications can be made therein without departing from the scope of the invention as defined in the appended claims.

What is claimed is:

1. A vehicle seat, comprising:
   a seat structure supportable on a vehicle floor;
   an upholstery part;
   a seat part mounted on said seat structure to be above the vehicle floor, said seat part being distinct from said upholstery part, having a bottom surface facing the vehicle floor and having an upper surface receiving said upholstery part, said upper surface being opposite to said bottom surface and situated higher than said bottom surface in a vertical direction perpendicular to the floor, said upper surface of said seat part has in a horizontal direction parallel to the vehicle floor a back end and a connecting region opposite to said back end in the horizontal direction, said connecting region of said seat part being continuous along a direction perpendicular to the horizontal direction; and
   a flexible support plate mounted on said seat part, said flexible support plate having a free front end that is freely movable and having a connecting end fixedly coupled directly to said upper surface of said seat part such that said flexible support plate is mounted in a cantilevered manner, said connecting end of said flexible support plate being fixedly and directly coupled to said connecting region of said seat part providing a smooth transition between said flexible support plate and said connecting region of said seat part, said flexible support plate having a bottom surface facing the vehicle floor and a top surface receiving said upholstery part, said top surface of said flexible support plate being opposite to said bottom surface of said flexible support plate relative to the vertical direction, said top surface of said flexible support plate being parallel to said upper surface of said seat part in said connecting region;

whereby, said flexible support plate moves toward said seat structure when subjected to a downward definable load to reduce compressive forces on bottoms of seat occupant thighs, and moves back in a reverse direction away from said seat structure to an initial position when unloaded.

2. A vehicle seat according to claim 1 wherein
said flexible support plate is formed of sheet metal.

3. A vehicle seat according to claim 1 wherein
said flexible support plate is formed of thermoplastic material.

4. A vehicle seat according to claim 3 wherein
said flexible support plate is formed of a fiber composite.

5. A vehicle seat according to claim 1 wherein
said flexible support plate is an integral extension of said seat part.

6. A vehicle seat according to claim 1 wherein
said top surface of said flexible support plate rises relative to the floor without discontinuing from said connecting end thereof up to a front end edge of said free front end when unloaded.

7. A vehicle seat according to claim 1 wherein
said seat structure comprises front and back support members extending transversely relative to said seat part, said seat part being fixedly connected to said back support member and being movable relative to said front support member.

8. A vehicle seat according to claim 1 wherein
said connecting end is opposite said free front end, and is fixedly connected to said upper surface of said seat part.

9. A vehicle seat according to claim 1 wherein
said free front end of said flexible support plate is covered by a downwardly extending projection of said upholstery part.

10. A vehicle seat according to claim 1 wherein
said upholstery part comprises a catch projection overlapping said free front end of said flexible support plate.

11. A vehicle seat according to claim 1 wherein
said upholstery part merely rests on and is unfixed on said flexible support plate, and is fixedly connected to said seat part.

12. A vehicle seat according to claim 11 wherein
said upholstery part moves on said flexible support plate upon application of a seat load on said upholstery part adjacent said flexible support plate.

13. A vehicle seat according to claim 1 wherein
said flexible support plate is a unitary, one-piece structure directly fixed to said upper surface of said seat part.

14. A vehicle seat according to claim 1 wherein
said flexible support plate when unloaded is spaced contact-free from and is movable in a direction of said seat structure in an upright position of the seat.

15. A vehicle seat according to claim 1 wherein
said flexible support plate is substantially planar.

16. A vehicle seat according to claim 1 wherein
said seat part has a front surface connecting said bottom surface with said upper surface, said upper surface forming a top edge with said front surface, said bottom surface forming a bottom edge with said front surface; and
said connecting end of the flexible support plate is fixedly connected to said upper surface of said seat part along said top edge.

17. A vehicle seat according to claim 1 wherein
said top surface of said flexible support plate is an angle-free continuation of said upper surface of said seat part in said connecting region.

18. A vehicle seat according to claim 1 wherein
the horizontal direction parallel to the vehicle floor is pointing towards a direction of a vehicle forward motion.

19. A vehicle seat according to claim 1 wherein
said seat part has a front surface connecting said bottom surface with said upper surface, said upper surface forming a top edge with said front surface, said bottom surface forming a bottom edge with said front surface; and
in a state of being subjected to a downward definable load, said flexible support plate transfers at least a part of said load to said seat part front surface to enhance a curvature in the vertical direction at said front surface.

20. A vehicle seat according to claim 1 wherein
said connecting region of said seat part top surface has a width equal to a width of said seat part.

21. A vehicle seat according to claim 1 wherein
said connecting region of said seat part top surface has a depth of at least than one third of a depth of said seat part, both measured in the horizontal direction; and
said connecting region commences opposite of said back end of said seat part top surface.

* * * * *